(12) United States Patent
Kang et al.

(10) Patent No.: US 7,440,046 B2
(45) Date of Patent: Oct. 21, 2008

(54) BACKLIGHT ASSEMBLY AND LIQUID CRYSTAL DISPLAY HAVING THE SAME

(75) Inventors: Sung Yong Kang, Cheonan-si (KR); Seong Sik Choi, Seoul (KR); Jheen Hyeok Park, Seongnam-Si (KR); Jeoung Gwen Lee, Suwon-Si (KR); Yong Gwang Won, Yongin-Si (KR); Tae Seok Jang, Seoul (KR)

(73) Assignee: Samsung Electronics Co., Ltd. (KR)

( * ) Notice: Subject to any disclaimer, the term of this patent is extended or adjusted under 35 U.S.C. 154(b) by 284 days.

(21) Appl. No.: 11/495,305

(22) Filed: Jul. 29, 2006

(65) Prior Publication Data

US 2007/0085943 A1 Apr. 19, 2007

(30) Foreign Application Priority Data

Oct. 14, 2005 (KR) ........................ 10-2005-0097122

(51) Int. Cl.
  *G02F 1/1335* (2006.01)
(52) U.S. Cl. ........................ 349/65; 349/58; 349/56
(58) Field of Classification Search .................. 349/65, 349/58, 61, 62, 67, 69, 70, 56, 113, 114
See application file for complete search history.

(56) References Cited

U.S. PATENT DOCUMENTS

| | | | | |
|---|---|---|---|---|
| 6,891,582 | B2 * | 5/2005 | Hwang | 349/58 |
| 6,910,782 | B2 * | 6/2005 | Ho | 362/632 |
| 2004/0170010 | A1 * | 9/2004 | Ho | 362/31 |
| 2006/0055843 | A1 * | 3/2006 | Hahm et al. | 349/69 |
| 2007/0085943 | A1 * | 4/2007 | Kang et al. | 349/65 |
| 2007/0268724 | A1 * | 11/2007 | Pan et al. | 362/633 |

* cited by examiner

*Primary Examiner*—Brian M Healy
(74) *Attorney, Agent, or Firm*—F. Chau & Associates, LLC

(57) ABSTRACT

The present disclosure relates to a liquid crystal display (LCD). There is provided an LCD comprising at least one lamp, a light guide plate for converting light incident from the lamp into a surface light source, an LCD panel disposed above the light guide plate for displaying an image thereon, a first reflection plate disposed below the light guide plate and including an end bent to extend parallel to a surface of the light guide plate such that the reflection plate can surround the lamp installed on the surface of the light guide plate, a mold frame including a space for accommodating the lamp, the light guide plate, the LCD panel and the reflection palate therein and including a portion of a sidewall protruding into the LCD to surround the top of the lamp, and a second reflection plate disposed on a rear surface of a portion of the mold frame arranged above the lamp. Therefore, a thin and lightweight LCD can be obtained and lamp efficiency can also be improved.

19 Claims, 5 Drawing Sheets

BACKLIGHT ASSEMBLY AND LIQUID CRYSTAL DISPLAY HAVING THE SAME

BACKGROUND OF THE INVENTION

1. Technical Field

The present disclosure relates to a backlight assembly, and more particularly, to a backlight assembly having a structure for enhancing lamp efficiency and a liquid crystal display having the same.

2. Discussion of the Related Art

Liquid crystal displays (LCDs) are widely used because of their lightweight, thin, low-power drive, full color and high resolution characteristics. LCDs are currently used in connection with devices such as, personal computers, notebook computers, PDAs, telephones, televisions, and audio/video devices. LCDs adjust an amount of light transmitted in accordance with image signals applied to a number of control switches arrayed in a matrix and then display a desired image on an LCD panel.

To this end, the LCD comprises an LCD panel on which images are displayed, an LCD drive integrated circuit (IC) for operating the LCD panel, a backlight unit used as a light source of the LCD, and a chassis used to fasten respective components of the LCD thereto. The backlight unit is classified into a direct type in which a light source is disposed at a surface of a panel to illuminate an entire surface of the panel and an edge type in which line light sources are disposed at one or more sides of a panel to reflect and diffuse light on, for example, a light guide plate, and a reflection plate.

FIG. 1 is an exploded perspective view of an LCD, and FIG. 2 is a schematic sectional view of the LCD shown in FIG. 1.

Referring to FIG. 1, a backlight unit is laminated on an LCD panel 5 in which a thin film transistor substrate with a plurality of pixels formed in a matrix and a color filter substrate with R, G and B color filters formed in a matrix are bonded with each other. The combined backlight unit and LCD panel are secured in a mold frame. A gate printed circuit board 7 for the application of driving signals is connected through a flexible printed circuit board at one side of the LCD panel 5. The gate printed circuit board 7 is interposed between a gate pad and gate TCP (Taped Carrier Package) of the LCD panel 5, and a data printed circuit 9 for the application of data signals is connected with a data pad through the flexible printed circuit board at the other side of the LCD panel 5. Under a bottom of the LCD panel 5 is sequentially laminated a plurality of optical sheets 11, a lamp 13, a light guide plate 15 and a reflection plate 17, which form the backlight unit 10. The lamp 13 serves as a light source of the backlight unit 10. The light guide plate 15 emits light generated from the lamp 13 toward the LCD panel 5 and a reflection plate 17 reflects light leaked from the light guide plate 15 toward the LCD panel 5 to enhance light efficiency.

The backlight unit and the LCD panel are inserted in the mold frame 21 such that they can be protected from an external impact and also optically aligned. Top and bottom chassis 1 and 22 are fastened to the top and bottom of the mold frame, respectively, to protect the LCD panel and the backlight unit from external impact.

Referring to FIG. 2, the backlight unit 10 composed of the plurality of optical sheets 11, the light guide plate 15, the reflection plate 17 and the lamp 13 is contained in the mold frame 21, and the lamp 13 is fixed to a lamp reflector 30.

The lamp 13 is installed at one side of the light guide plate 15, and the lamp reflector 30 is used to fix the lamp 13 thereto. Further, an inner surface of the lamp reflector 30 is coated with metal to increase its reflection factor. As a result, light propagating in a direction away from the light guide plate 15 can be reflected to a direction toward the light guide plate 15 so as to be incident on the side of the light guide plate 15. In addition, light that leaks from the light guide plate 15 and then propagates downwards is reflected toward the LCD panel by means of the reflection plate 17 disposed below the light guide plate 15.

Since the lamp reflector 30 includes a metallic material and is arranged in a longitudinal direction of the lamp such that it can fix the lamp, the light guide plate and reflection plate thereto, the lamp reflector 30 has a high weight. Thus, it is difficult to make an LCD that includes the lamp reflector 30 thin and lightweight. Further, when operating the LCD lamp, heat generated from the lamp is not easily released to the outside due to the lamp reflector 30. Therefore, it is also difficult to maintain a lamp temperature at which lamp efficiency can be maximized.

SUMMARY OF THE INVENTION

Embodiments of the present invention provide a thin and lightweight liquid crystal display (LCD) configured such that a reflection plate can function as an existing lamp reflector to easily release heat generated from the lamp to the outside.

According to an embodiment of the present invention an LCD comprises at least one lamp, a light guide plate, an LCD panel disposed above the light guide plate, a first reflection plate disposed below the light guide plate and including an end bent to extend parallel to an incident surface of the light guide plate such that the reflection plate can surround the lamp installed on the incident surface of the light guide plate, a mold frame including a predetermined accommodating space for accommodating the lamp, the light guide plate, the LCD panel and the reflection plate therein and including a portion of a sidewall protruding to the accommodating space to surround the top of the lamp and a second reflection plate disposed on a rear surface of a portion of the mold frame arranged above the lamp.

A groove with a predetermined depth may be formed on the rear surface of the mold frame and the first reflection plate may be coupled into the groove of the mold frame.

The groove of the mold frame may be formed at a position corresponding to the bent and extended end of the first reflection plate.

Each of the first and second reflection plates may further include a shielding layer.

The shielding layer may be arranged on the second reflection plate and a portion of the first reflection plate surrounding the lamp.

The shielding layer may include a copper foil.

The LCD may further comprise a bottom chassis installed below the first reflection plate and coupled with the mold frame, and the bottom chassis may be formed to correspond to the shape of the first reflection plate.

The LCD may further comprise a lower mold frame installed below the bottom chassis and coupled with the bottom chassis and the mold frame.

The LCD may further comprise a top chassis coupled with the mold frame to cover a predetermined edge region of the LCD panel and a side surface of the mold frame.

A diffusion plate for diffusing light incident from the light guide plate and a prism sheet for focusing the light diffused from the diffusion plate in a direction perpendicular to a surface of the LCD panel may be installed on the light guide plate.

The light guide plate may convert an incident light from the lamp into a plane light.

The LCD panel may display an image thereon.

According to another embodiment of the present invention, there is provided a backlight assembly, comprising at least one lamp, a light guide plate for converting an incident light from the lamp into a plane light, a first reflection plate disposed below the light guide plate and including an end bent to extend parallel to an incident surface of the light guide plate such that the reflection plate can surround the lamp installed on the incident surface of the light guide plate, a mold frame including a predetermined accommodating space for accommodating the lamp, the light guide plate, the reflection plate therein and including a portion of a sidewall protruding to the accommodating space to surround the top of the lamp, and a second reflection plate disposed on a rear surface of a portion of the mold frame arranged above the lamp.

BRIEF DESCRIPTION OF THE DRAWINGS

Exemplary embodiments of the present invention can be understood in more detail from the following descriptions taken in conjunction with the accompanying drawings, in which.

DETAILED DESCRIPTION OF THE EXEMPLARY EMBODIMENTS

Hereinafter, exemplary embodiments of the present invention will be described in detail with reference to the accompanying drawings. This invention may, however, be embodied in different forms and should not be construed as limited to the embodiments set forth herein.

Figure 1:
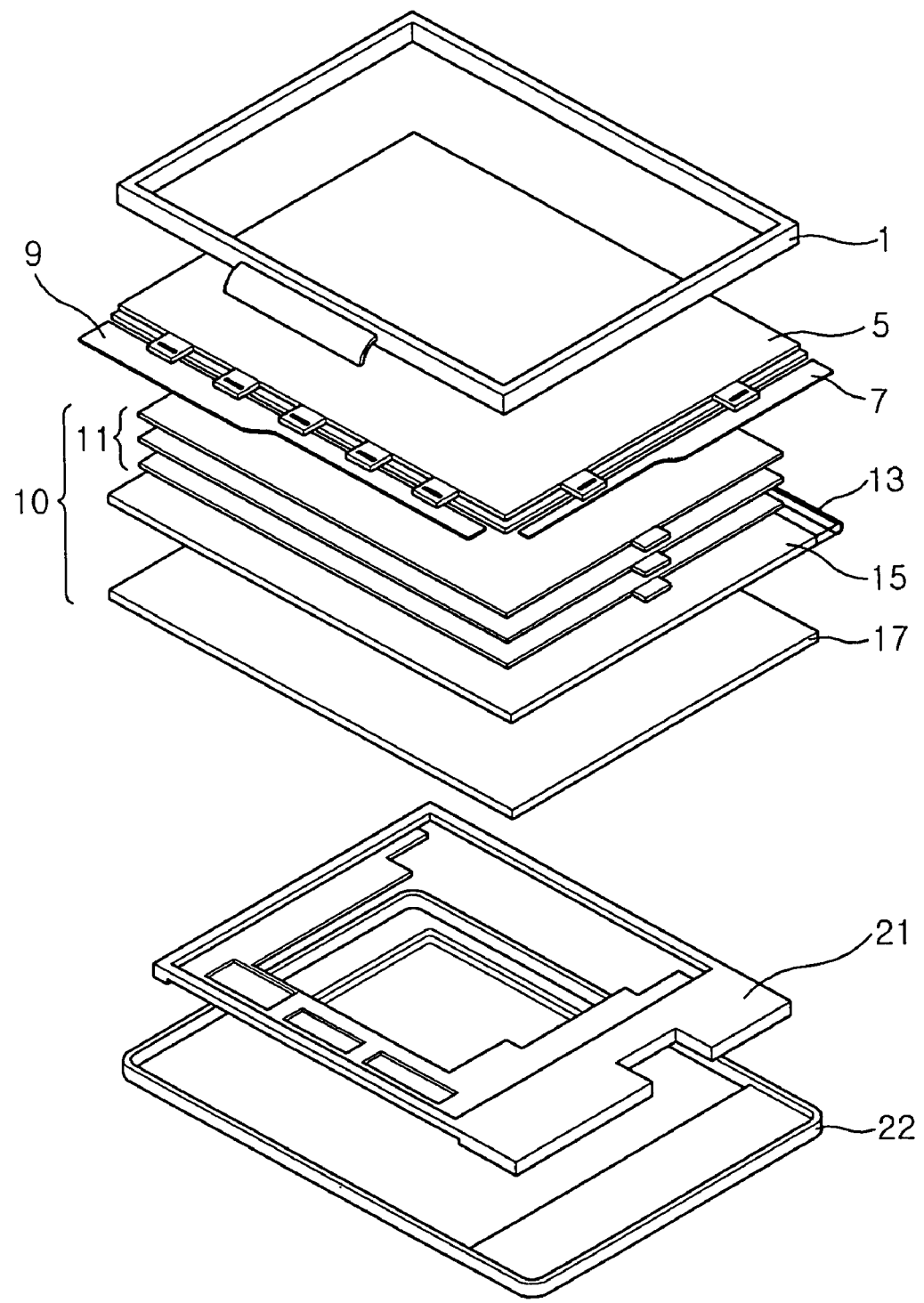
FIG. 1 is an exploded perspective view of a liquid crystal display (LCD)
Figure 2:
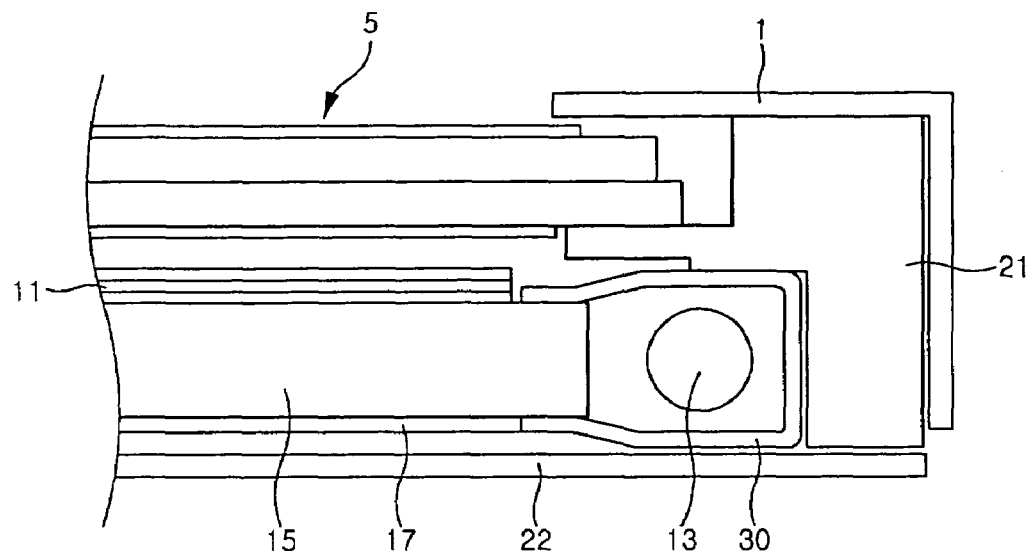
FIG. 2 is a schematic sectional view of the LCD shown in FIG. 1.
Figure 3:
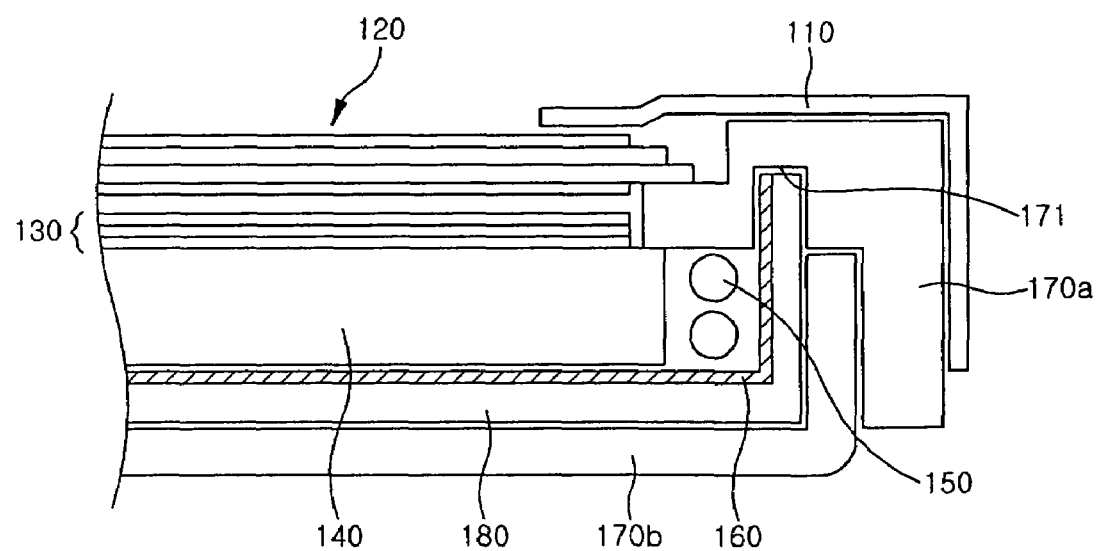
FIG. 3 is a schematic sectional view of an LCD according to an embodiment of the present invention.

FIG. 3 is a schematic sectional view of a liquid crystal display (LCD) according to an embodiment of the present invention.

The LCD shown in FIG. 3 contains an edge type backlight unit that can be used in a small and medium-sized LCD such as in a laptop computer or desktop computer. The LCD comprises a top chassis 110, an LCD panel 120, a driving circuit unit (not shown), a plurality of optical sheets 130, a light guide plate 140, lamps 150, a reflection plate 160, mold frames 170a and 170b, and a bottom chassis 180.

To prevent the LCD panel 120 and the driving circuit unit from being separated and to protect the LCD panel and driving circuit unit from external impact, the top chassis 110 is constructed in the form of a rectangular frame having a planar portion and sidewall portions, which are bent at right angles with respect to each other.

Figure 4:
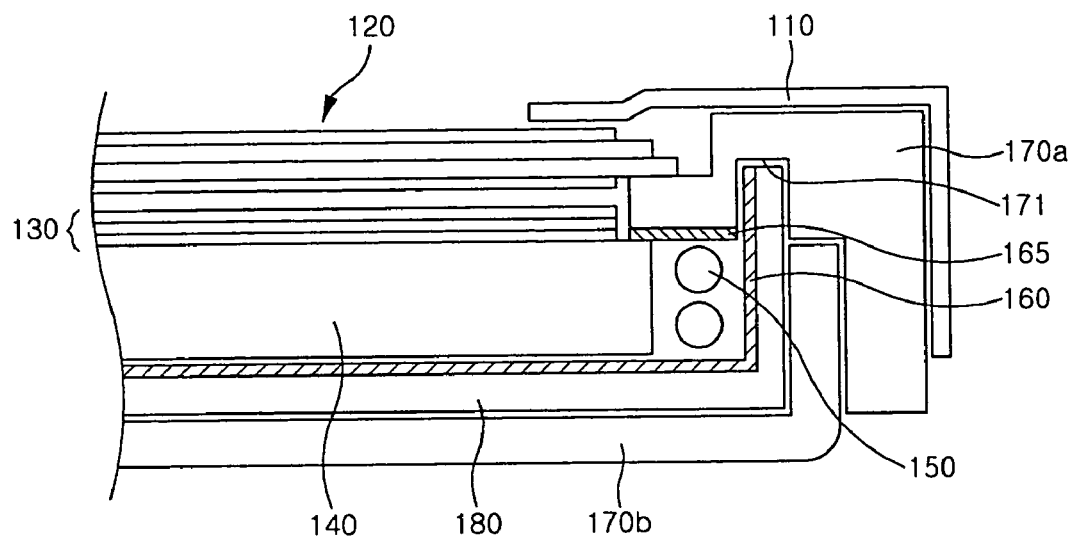
FIG. 4 is a schematic sectional view of an LCD according to another embodiment of the present invention.
Figure 5:
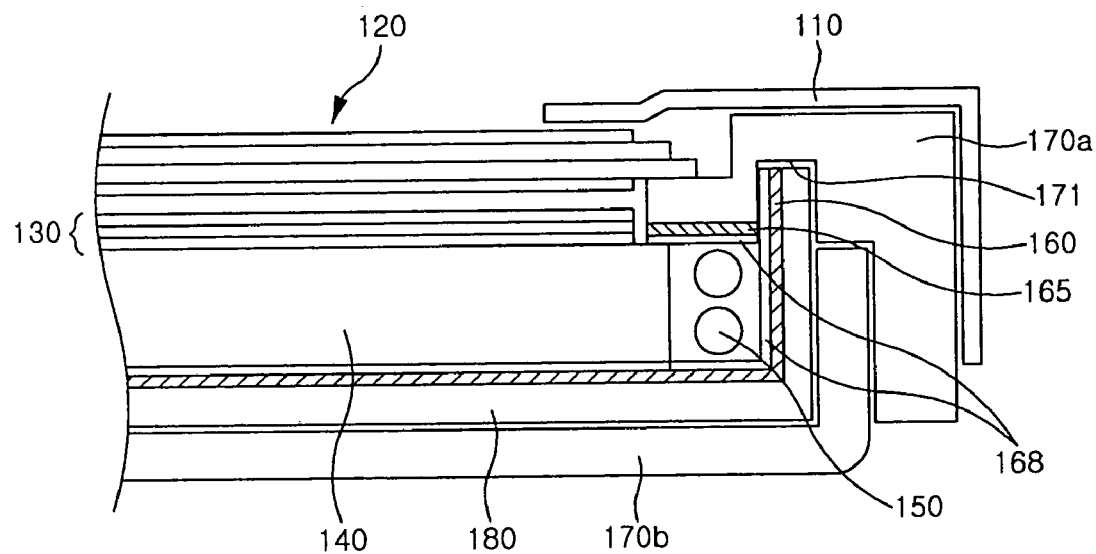
FIG. 5 is a schematic sectional view of an LCD according to another embodiment of the present invention.

In an embodiment of the present invention, a cold cathode-ray tube type lamp is used as the lamp 150. Each of the lamps 150 may be shaped as an "I", but are not limited thereto. For example, the lamp 150 may take various shapes such as N, M and serpentine shapes. In addition, as shown in FIGS. 3-5, for example, two lamps 150 are installed at a side of the light guide plate 140. Alternatively, the number of lamps may be one or more than two. Further, the lamps 150 may be installed either only at one side or at both sides of the light guide plate 140.

The plurality of optical sheets 130 are disposed on the top of the light guide plate 140 such that the brightness distribution of light emitted from the light guide plate 140 can be uniform. The plurality of optical sheets 130 include a diffusion plate for diffusing light incident from the light guide plate 140 and a prism sheet for focusing the light diffused from the diffusion plate in a direction perpendicular to the LCD panel 120.

The light guide plate 140 converts light generated from the lamp 150 having an optical distribution in the form a line light source into light having an optical distribution in the form of a surface light source. A taper type plate or parallel flat plate may be used as the light guide plate 150.

The reflection plate 160 is disposed below the light guide plate 140 and bent to extend in a direction parallel to a side surface of the light guide plate 140. The reflection plate 160 surrounds the bottom surface of the light guide plate 140 and the lamps 150 arranged at the side surface of the light guide plate 140. That is, the reflection plate 160 is bent in the form of "☐". Preferably, a groove 171 with a certain depth is formed on a rear surface of the mold frame 170a. The groove 171 contacts the bent portion of the reflection plate 160, so that the bent portion of the reflection plate can be interconnected with the groove 171.

The reflection plate 160 includes a highly reflective plate and contacts a floor surface of the bottom chassis 180. Although the reflection plate 160 is shown flat in this figure, it may be constructed into a shape having a reference reflection surface and triangular ridges protruding from the reference reflection surface. In a case where the lamps are installed at both sides of the light guide plate 140, an additional reflection plate, which is substantially the same as the reflection plate 160, can be installed at the other side of the light guide plate 140.

The bottom chassis 180 is formed under the reflection plate 160 to correspond to the shape of the reflection plate 160.

That is, like the reflection plate 160, the bottom chassis 180 is bent to extend in a direction parallel to a side surface of the light guide plate 140 to surround the bottom surface of the light guide plate 140 and the lamps 150 arranged at the side surface of the light guide plate 140.

The mold frame 170a is formed with an accommodating space therein, in which the plurality of optical sheets 130, the light guide plate 140, the lamps 150 and the reflection plate 160 are inserted. A stepped portion is formed on an inner side of the mold frame 170a, and the LCD panel 120 is disposed on the stepped portion.

The mold frame 170b (hereinafter, referred to as "lower mold frame") is formed below the bottom chassis 180 and bonded to the mold frame 170a and the bottom chassis 180. The lower mold frame 170b is formed separately from the mold frame 170a such that the reflection plate 160 and the bottom chassis 180 can be easily assembled. Although it is described in this embodiment that a mold frame is divided into two parts (170a and 170b), in the alternative, the mold frame can be formed as a unit.

As described above, a structure such as the bent reflection plate 160 can reflect light propagating in a direction away from the light guide plate 140 to a direction toward the light guide plate 140 and cause the light to be incident on the side of the light guide plate 140 without an additional lamp reflector.

FIG. 4 is a schematic sectional view of an LCD according to another embodiment of the present invention, which is different from the LCD according to the embodiment described in connection with FIG. 3 in that an additional reflection plate is arranged above the lamp. The other components are similar to those described in connection with the previous embodiment.

Referring to FIG. 4, the LCD comprises a top chassis 110, an LCD panel 120, a driving circuit (not shown), a plurality of optical sheets 130, a light guide plate 140, lamps 150, a reflection plate 160, an additional reflection plate 165, a mold frame 170a, a lower mold frame 170b and a bottom chassis 180.

The reflection plate 160 is disposed below the light guide plate 150 and bent to extend in a direction parallel to a side surface of the light guide plate 140. The reflection plate 160 surrounds the bottom surface of the light guide plate 140 and the lamps 150 arranged at the side surface of the light guide plate 140. That is, the reflection plate 160 is bent in the form of "☐". A groove 171 with a certain depth is formed on a rear surface of the mold frame 170a. The groove 171 contacts the bent portion of the reflection plate 160, so that the bent portion of the reflection plate can be interconnected with the groove 171. Light propagating in a direction toward the bottom of the lamp 150 and opposite to the light guide plate 140 is reflected by the reflection plate 160 such that the light can be incident on the bottom and side surface of the light guide plate 140.

Furthermore, to effectively reflect light in a direction toward the top of the lamp 150, the additional reflection plate 165 is arranged above the lamp 150. The additional reflection plate 165 is attached to a rear surface of the mold frame 170a arranged above the lamp 150.

FIG. 5 is a schematic sectional view of an LCD according to another embodiment of the present invention, which is different from the LCD according to the embodiment described in connection with FIG. 4 in that a shielding layer is formed at a predetermined region of a reflection plate. The other components are similar to those described in connection with the previous embodiments.

Referring to FIG. 5, the LCD comprises a top chassis 110, an LCD panel 120, a driving circuit (not shown), a plurality of optical sheets 130, a light guide plate 140, lamps 150, a reflection plate 160, an additional reflection plate 165, a shielding layer 168, a mold frame 170a, a lower mold frame 170b and a bottom chassis 180.

When the LCD is operated, it is possible that a driving frequency of the LCD panel 120 may interfere with a frequency of an inverter for driving the lamps 150. In order to prevent this interference, the shielding layer 168 is formed to surround the lamps 150 as shown in FIG. 5.

The shielding layer 168 is installed on the reflection plate 160 and the additional reflection plate 165. The shielding layer 168 is disposed on the additional reflection plate 165 and a portion of the reflection plate 160 that surrounds the lamps 150. The shielding layer 168 can be coated with a copper foil, but is not limited thereto. Alternatively, the shielding layer 168 may be coated with a variety of materials that are effective for electromagnetic shielding.

Figure 6A:
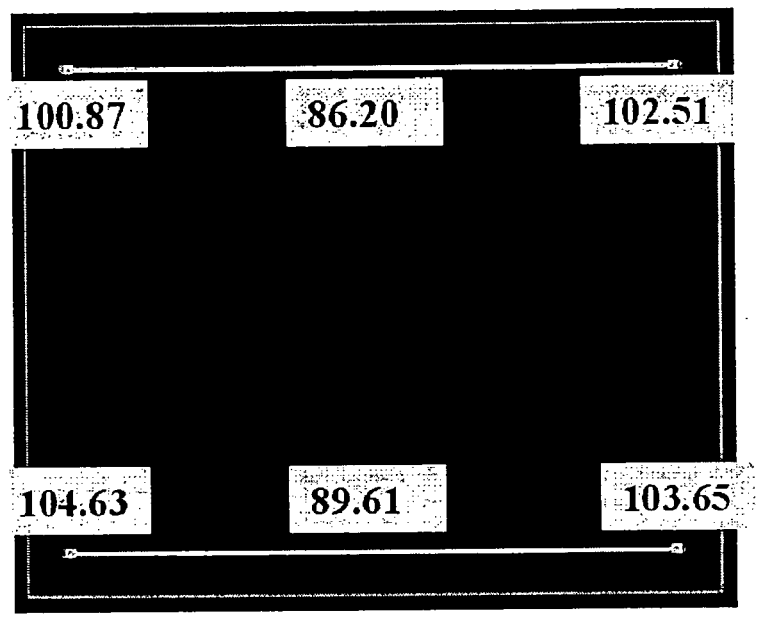
FIGS. 6a and 6b are views showing simulation results of surface temperatures of lamps in a conventional LCD and an LCD according to an embodiment of the present invention.
Figure 6B:
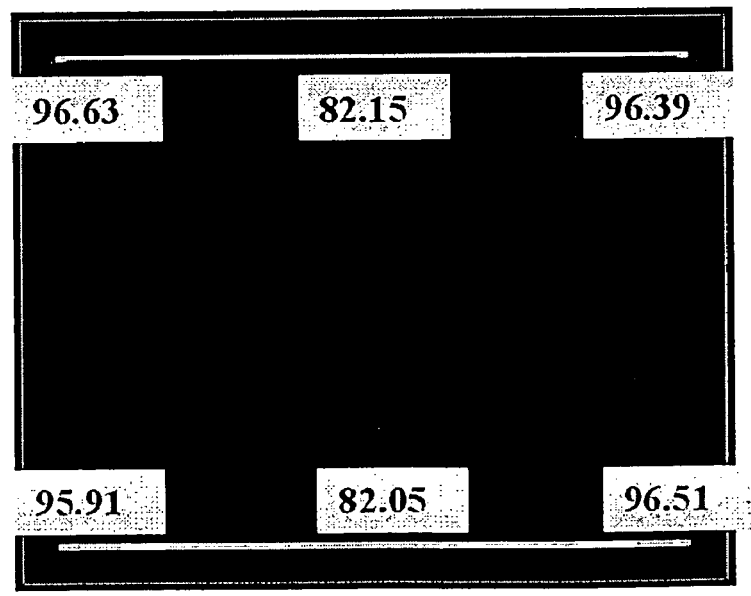
Figure 7:
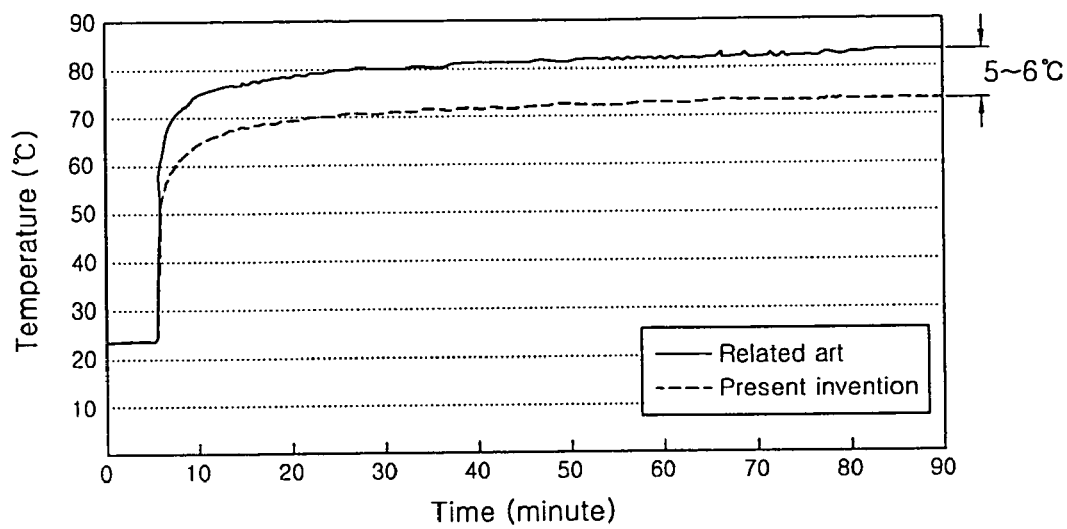
FIG. 7 is a graph plotting measurement results of surface temperatures of lamps in a conventional LCD and an LCD according to an embodiment of the present invention.

FIGS. 6a and 6b are views showing simulation results of surface temperatures of lamps in a conventional LCD an LCD according to an embodiment of the present invention, and FIG. 7 is a graph plotting measurement results of surface temperatures of lamps in a conventional LCD and an LCD according to an embodiment of the present invention.

FIGS. 6a and 6b show the temperature simulation results for electrode portions and center portions of the lamps, when the lamps in a conventional LCD and in an LCD according to an embodiment of the present invention are driven. FIG. 6A shows two examples of temperature simulation results at electrode (end) portions and at center portions of a conventional LCD. FIG. 6B shows two examples of temperature simulation results at electrode (end) portions and at center portions of an LCD according to an embodiment of the present invention. Referring to FIGS. 6a and 6b, the temperatures of the lamp electrode portions are higher that those of the lamp center portions when the lamps are driven and the temperatures of the lamp according to an embodiment of the present invention, in which a lamp reflector is not provided (FIG. 6B), is lower than those of a conventional LCD (FIG. 6A).

Referring to FIG. 7, when about 90 minutes has passed after a lamp has been driven, the temperature (about 71° C.) of the lamp electrode portion according to an embodiment of the present invention is lower by about 5 to about 6° C. than the temperature (about 77° C.) of the lamp electrode portion of a conventional LCD.

Figure 8:
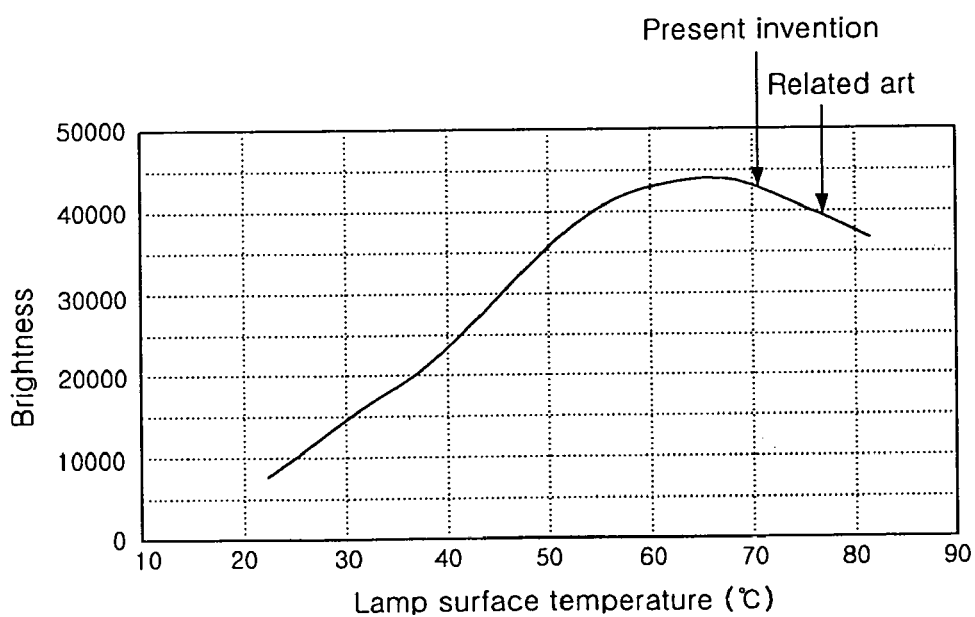
FIG. 8 is a graph plotting a brightness characteristic depending on a surface temperature of a lamp.

FIG. 8 is a graph showing a brightness characteristic depending on a surface temperature of a lamp.

It is understood from FIG. 8 that a lamp has a good brightness characteristic at a lamp temperature range of about 60 to 70° C. As described above, when about 90 minutes has passed after the lamp has been driven, the temperature of the conventional lamp electrode portion is about 77° C. and the temperature of the lamp electrode portion according to an embodiment of the present invention is about 71° C. Therefore, the brightness is improved about 9% in an embodiment of the present invention when compared to a conventional device.

According to embodiments of the present invention, a structure of a reflection plate is modified such that the reflection plate can also perform as an lamp reflector. Therefore, it is possible to reduce the production costs of LCDs and also to produce thin and lightweight LCDs.

Further, since heat generated from a lamp is easily released to the outside through a bottom chassis, lamp efficiency can be maximized. Therefore, the brightness of LCDs can be improved.

Although the illustrative embodiments have been described herein with reference to the accompanying drawings, it is to be understood that the present invention is not limited to those precise embodiments, and that various other changes and modifications may be affected therein by one of ordinary skill in the related art without departing from the scope or spirit of the invention. All such changes and modifications are intended to be included within the scope of the invention as defined by the appended claims.

What is claimed is:

1. A liquid crystal display (LCD), comprising:
   at least one lamp;
   a light guide plate;
   an LCD panel disposed above the light guide plate;
   a first reflection plate disposed under the light guide plate and including an end bent to extend parallel to a side surface of the light guide plate such that the reflection plate can surround the lamp installed on the side surface of the light guide plate;

a mold frame including a space for accommodating the lamp, the light guide plate, the LCD panel and the reflection plate therein and including a portion of a sidewall protruding to the space to surround a top of the lamp; and a second reflection plate disposed on a surface of a portion of the mold frame arranged above the lamp.

2. The LCD as recited in claim 1, wherein a groove with a predetermined depth is formed on the surface of the mold frame, and the first reflection plate is coupled into the groove.

3. The LCD as recited in claim 2, wherein the groove is formed at a position corresponding to the bent end of the first reflection plate.

4. The LCD as recited in claim 1, wherein each of the first and second reflection plates further includes a shielding layer.

5. The LCD as recited in claim 4, wherein the shielding layer is arranged on the second reflection plate and a portion of the first reflection plate surrounding the lamp.

6. The LCD as recited in claim 4, wherein the shielding layer includes a copper foil.

7. The LCD as recited in claim 1, further comprising a bottom chassis positioned under the first reflection plate and coupled with the mold frame, wherein the bottom chassis is formed to correspond to the shape of the first reflection plate.

8. The LCD as recited in claim 7, further comprising a lower mold frame positioned under the bottom chassis and coupled with the bottom chassis and the mold frame.

9. The LCD as recited in claim 1, further comprising a top chassis coupled with the mold frame to cover a predetermined edge region of the LCD panel and a side surface of the mold frame.

10. The LCD as recited in claim 1, wherein a diffusion plate for diffusing light incident from the light guide plate and a prism sheet for focusing light diffused from the diffusion plate in a direction perpendicular to a surface of the LCD panel are installed on the light guide plate.

11. The LCD as recited in claim 1, wherein the light guide plate converts an incident light from the lamp into a plane light.

12. The LCD as recited in claim 1, wherein the LCD panel displays an image thereon.

13. A backlight assembly, comprising:
at least one lamp;
a light guide plate;
a first reflection plate disposed under the light guide plate and including an end bent to extend parallel to a side surface of the light guide plate such that the reflection plate can surround the lamp installed on the side surface of the light guide plate;
a mold frame including a space for accommodating the lamp, the light guide plate, and the reflection plate therein and including a portion of a sidewall protruding to the accommodating space to surround a top of the lamp; and
a second reflection plate disposed on a surface of a portion of the mold frame arranged above the lamp.

14. The backlight assembly as recited in claim 13, wherein a groove with a predetermined depth is formed on the surface of the mold frame, and the first reflection plate is coupled into the groove of the mold frame.

15. The backlight assembly as recited in claim 14, wherein the groove is formed at a position corresponding to the bent end of the first reflection plate.

16. The backlight assembly as recited in claim 13, wherein each of the first and second reflection plates further includes a shielding layer.

17. The backlight assembly as recited in claim 16, wherein the shielding layer is arranged on the second reflection plate and a portion of the first reflection plate surrounding the lamp.

18. The backlight assembly as recited in claim 16, wherein the shielding layer includes a copper foil.

19. The backlight assembly as recited in claim 13, wherein a diffusion plate for diffusing light incident from the light guide plate and a prism sheet for focusing light diffused from the diffusion plate in a direction perpendicular to a surface of a liquid crystal display panel are installed on the light guide plate.

* * * * *